March 10, 1942.  C. E. KRAUS  2,275,443
METHOD OF AND MACHINE FOR MILLING
Filed Feb. 17, 1939  5 Sheets-Sheet 1
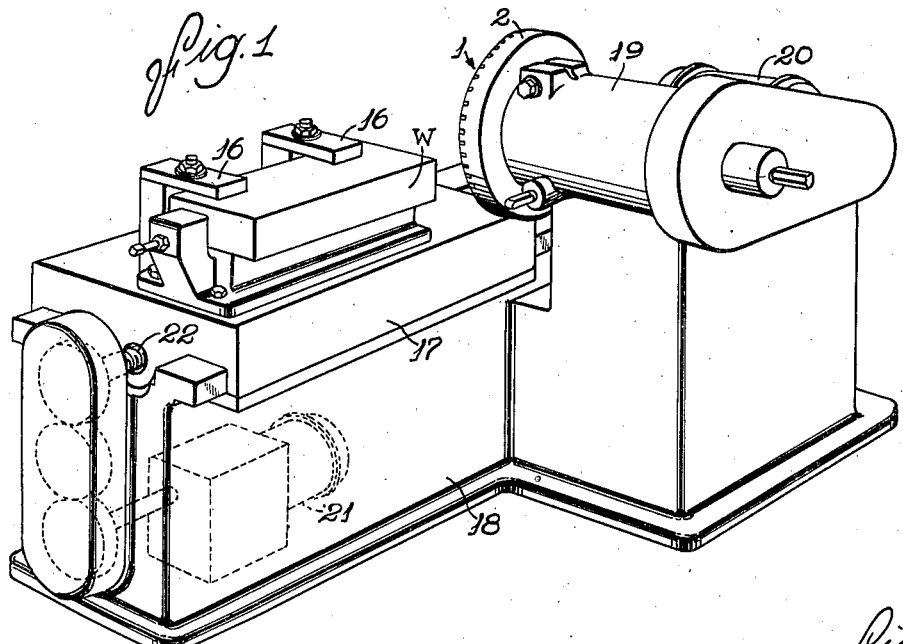
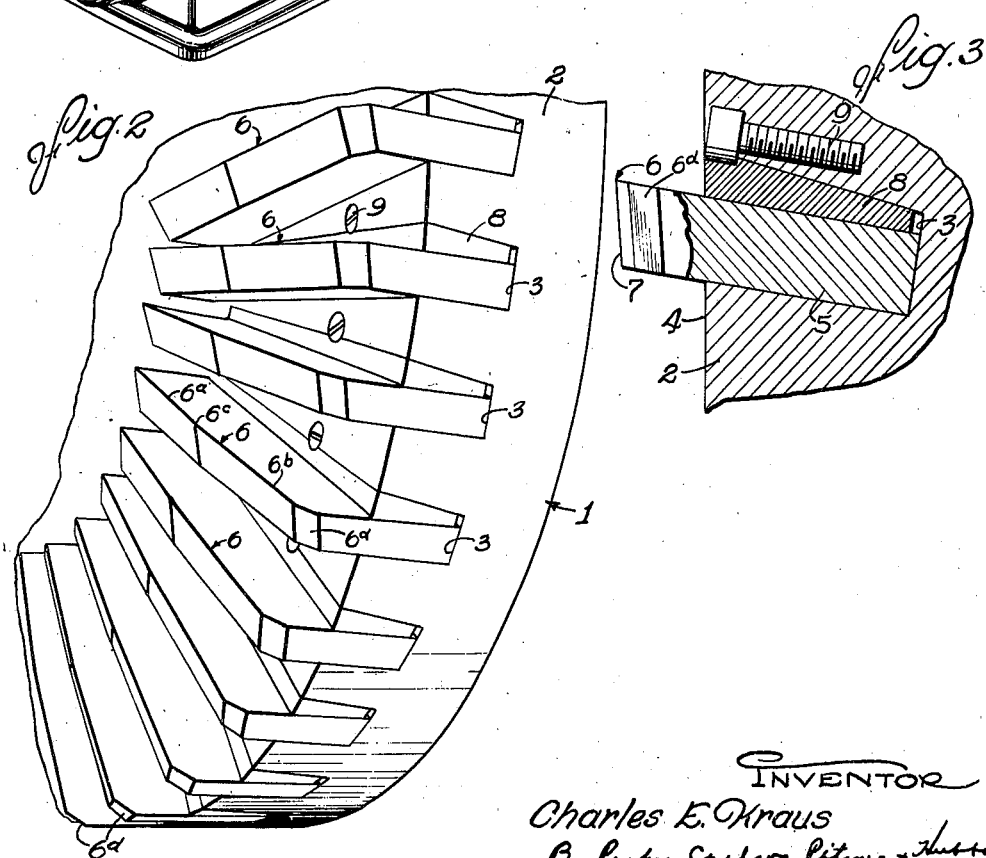
INVENTOR
Charles E. Kraus
By Parker, Carlson, Pitzner & Hubbard
ATTORNEYS March 10, 1942. C. E. KRAUS 2,275,443
METHOD OF AND MACHINE FOR MILLING
Filed Feb. 17, 1939 5 Sheets-Sheet 2
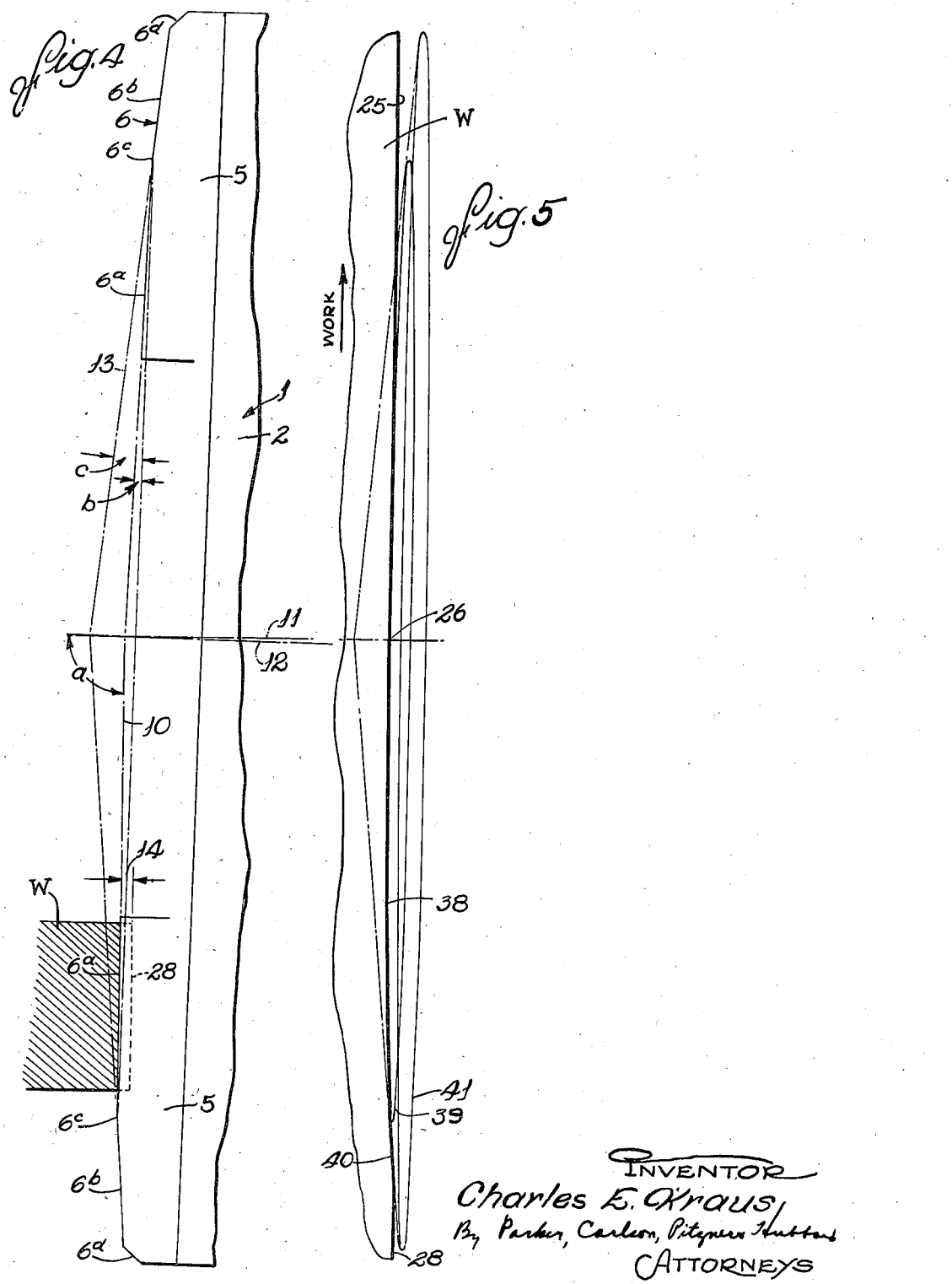

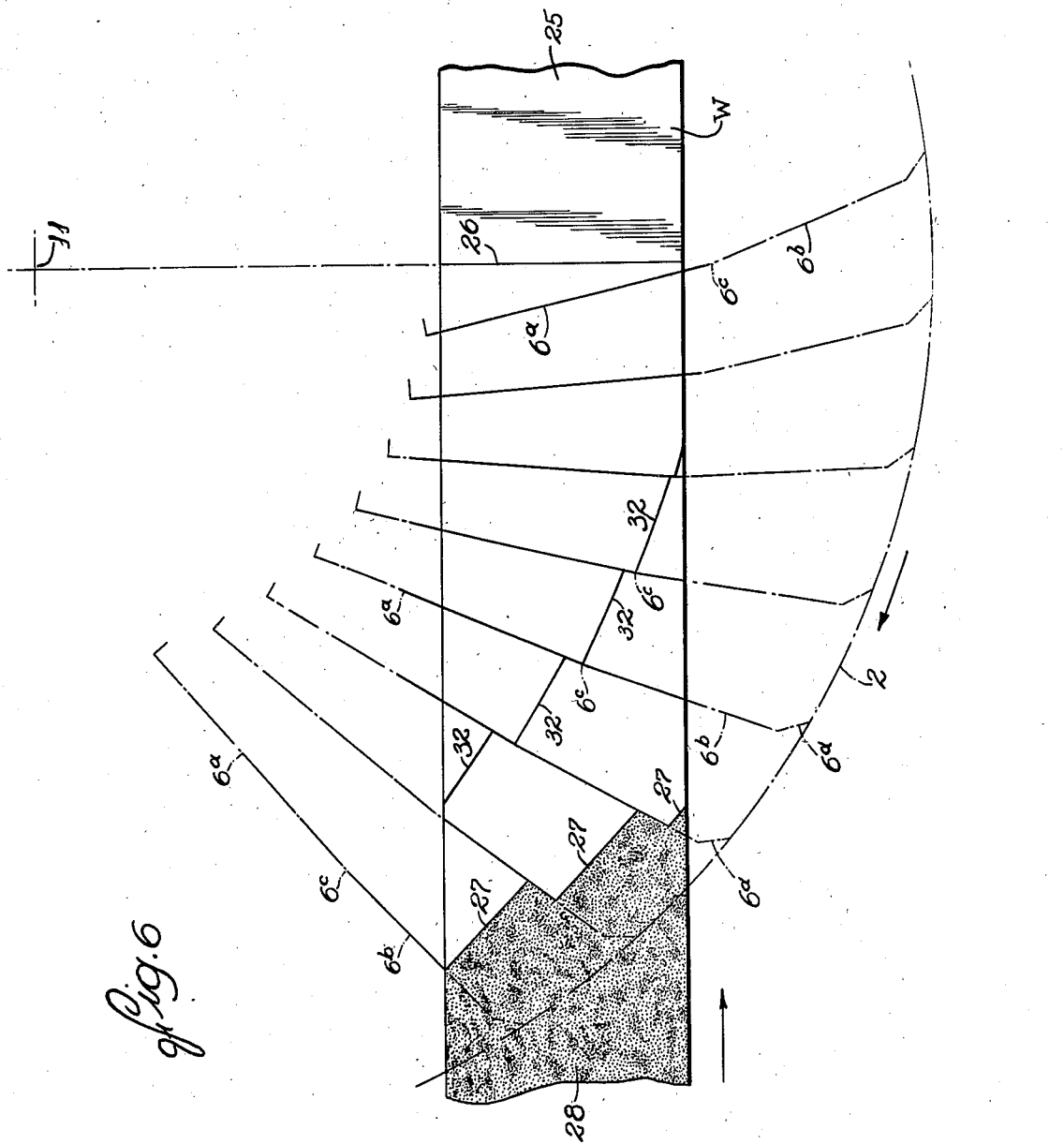

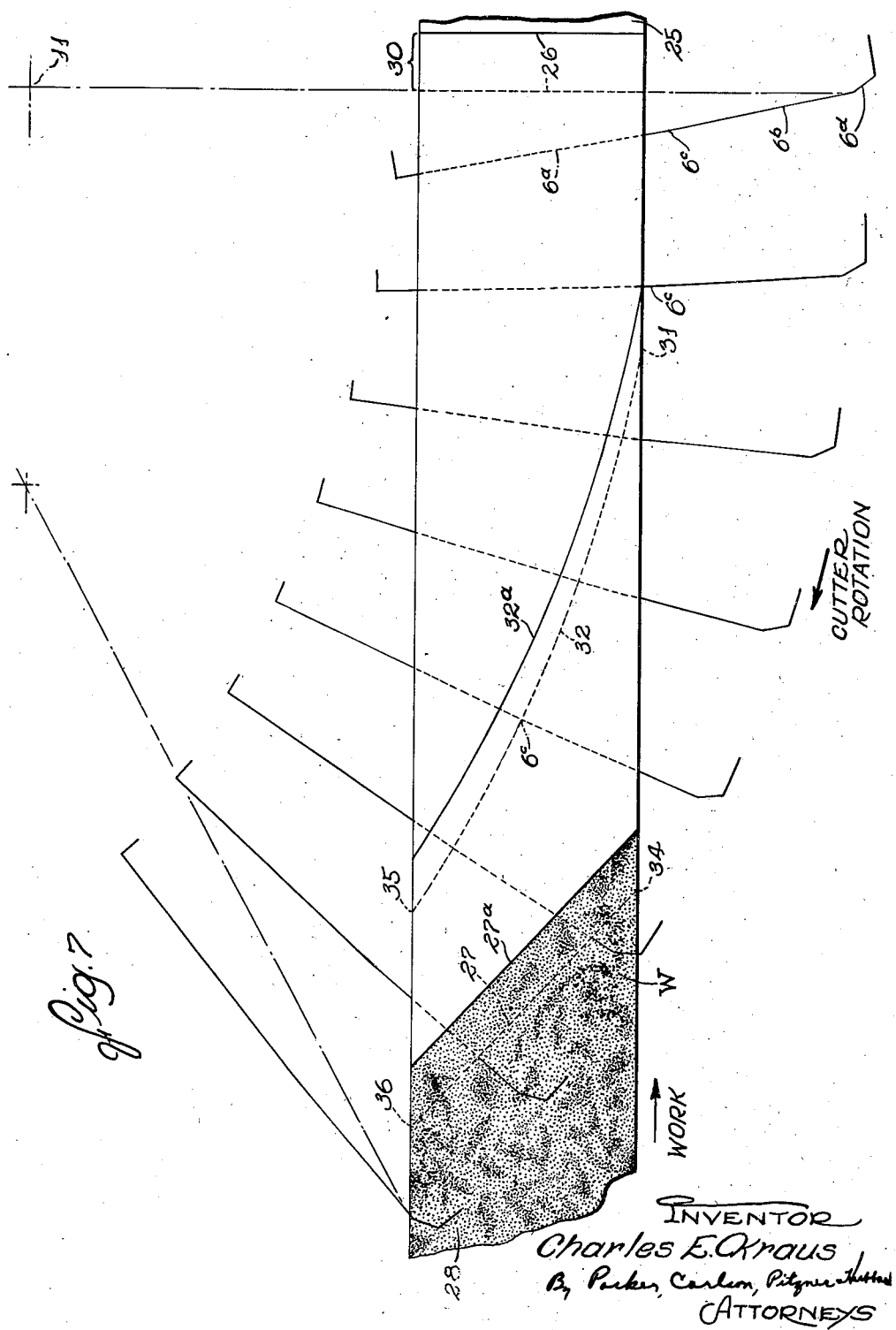

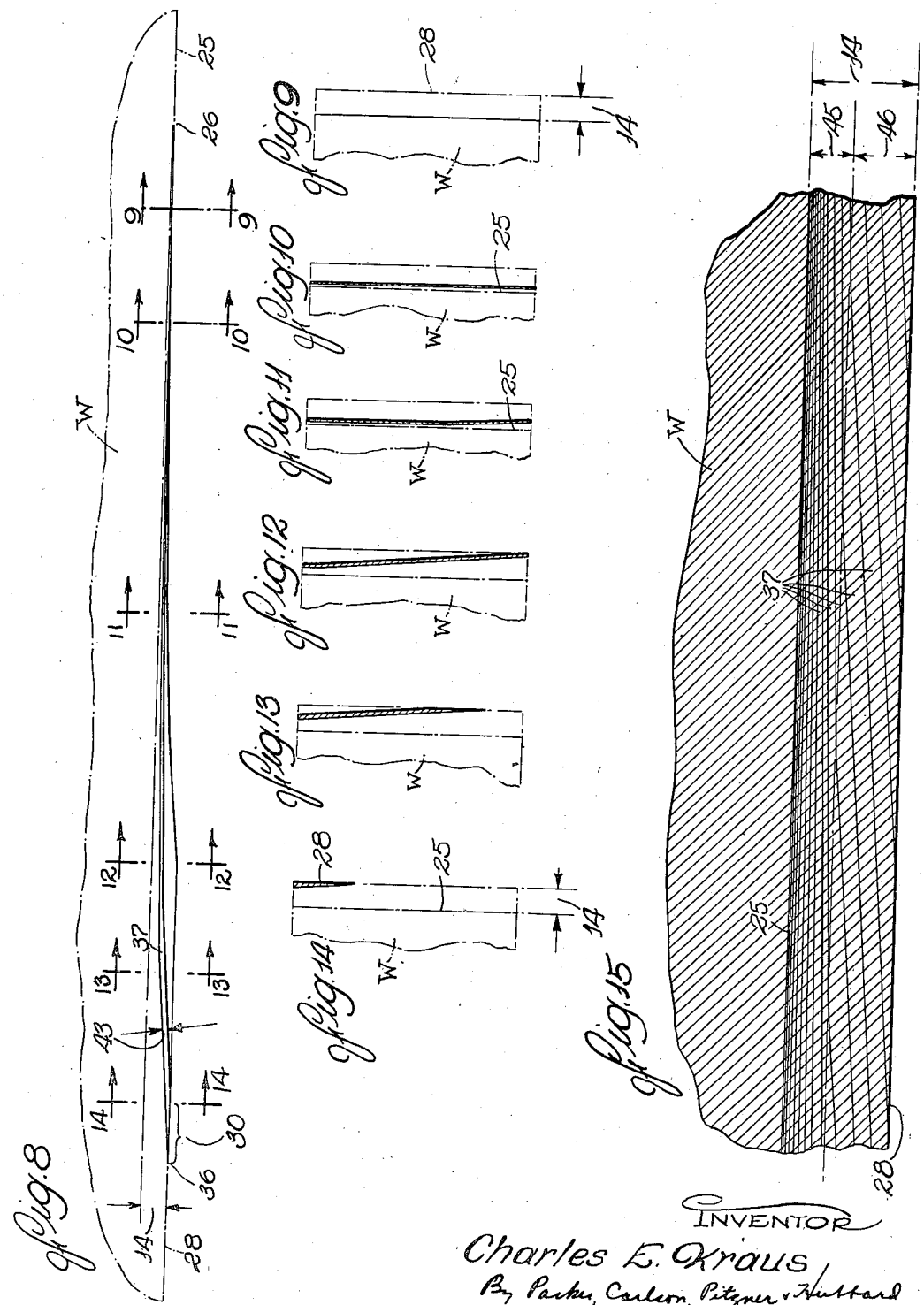

Patented Mar. 10, 1942

2,275,443

UNITED STATES PATENT OFFICE 2,275,443

METHOD OF AND MACHINE FOR MILLING

Charles E. Kraus, Rockford, Ill., assignor to The Ingersoll Milling Machine Company, Rockford, Ill., a corporation of Illinois Application February 17, 1939, Serial No. 256,846

13 Claims. (Cl. 90—18)

This invention relates to the milling of work pieces with a multiple blade rotary cutter having an end face of shallow conical contour, and the general object is to improve upon the method disclosed in my Patent No. 2,148,479 by prolonging the service life of the cutter in producing a smooth finish particularly when milling work pieces such as castings having hard scaly surfaces.

Another object is to provide a new and improved machine and cutter for carrying out the improved method.

The invention also resides in the novel construction of the cutter which facilitates sharpening thereof.

Other objects and advantages of the invention will become apparent from the following detailed description taken in connection with the accompanying drawings, in which Figure 1 is a perspective view showing the elements of a typical milling machine in which the present invention may be practiced.

Fig. 2 is a perspective view of the cutter.

Fig. 3 is a fragmentary sectional view through one of the cutter blades and its mounting.

Fig. 4 is a fragmentary side view of the cutter showing its relation to a work piece to be operated upon.

Fig. 5 is a diagrammatic view showing the ellipses of intersection between the cutting faces of the cutter and the work piece.

Fig. 6 is an elevational view of the work piece showing the instantaneous positions of different cutting edges.

Fig. 7 is a similar view of a work piece showing successive steps in the progress of one blade edge through the work.

Fig. 8 is a side view of the work showing the position and shape of the chip removed by one blade edge.

Figs. 9 to 14 inclusive are sections taken along the lines 9—9 to 14—14 inclusive of Fig. 8.

Fig. 15 is an enlarged fragmentary transverse section of the work piece showing the lines on which successive cutting edges pass through the section.

While the invention is susceptible of various modifications and is capable of being practiced in a wide variety of machines, I have shown in the drawings and will describe herein the preferred forms of the invention and typical machines for practicing the same. I do not intend to limit the invention by such exemplary disclosure, but aim to cover all modifications and alternative methods and constructions falling within the spirit and scope of the invention as expressed in the appended claims.

As applied to the removal of a layer of metal from a work piece to form a plane surface thereon, the improved method illustrated in the drawings comprises revolving a series of cutting edges defining an inner shallow frusto-conical cutting face of a width greater than the finished work surface and a contiguous outer coned face of greater slope than the first face, positioning the work piece with the plane of the finished surface to be formed disposed tangent to the inner cutting face, and effecting relative bodily feeding movement between the work piece and the revolving cutting edges in a direction longitudinally of said plane and transversely of the line of tangency between the plane and the inner cutting face. The cone angles of the inner and outer cutting faces are of such small magnitude that each edge, as it cuts broadwise through the work longitudinally of the direction of feed and laterally across the work, removes a chip or slice of metal which is as wide as the work, is very long in the direction of feed so that the chip thickness and therefore the wear on the cutting edges are not influenced to a substantial degree by the rate of feed. Since the initial zone of engagement between each cutting edge and the work lies within the circle of intersection of the two cutting faces, the lower part of the metal layer being removed will always be cut by the inner cutting face while the upper part including the hard scale on the rough surface will be milled by the outer cutting face. By thus confining the major cutting burden to the outer cutter face, the ability of the inner cutting face to produce a fine finish through long periods of service use will be maintained effectively. Also, by making the inner face shallower than the outer face, the angles at which the inner portions of the cutting edges pass through the work may be decreased as desired so as to produce optimum smoothness of the finished work surface without at the same time decreasing the overall thickness of the metal layer which the cutter is capable of removing.

Preferably, the cutter employed and indicated generally at 1 is of the inserted blade type and in the exemplary form shown in Figs. 1, 2, and 3 comprises a cylindrical body or head 2 having relatively closely spaced slots 3 formed in one end of a transaxial face 4 and extending generally radially at shear angles determined by the kind of work material to be milled. The slots receive blades 5 each positioned with one side portion projecting from the body slot and comprising a block of cutting material having a cutting edge 6 extending along the leading edge of the exposed surface 7 which slopes away from the cutting edge to afford proper clearance. The blades may be locked in the body in any desired manner, the one shown herein being fastened by inwardly tapering wedges 8 received between the blade and the opposite wall of its slot and held in place by a screw 9.

In accordance with the present invention, the blade edges 6 are divided longitudinally into inner and outer end portions 6ª and 6ᵇ which are differently positioned in the body and which intersect at a point 6ᶜ. Preferably, the extreme outer end of the blade is beveled as indicated at 6ᵈ. Where a plane surface is to be formed on the work piece, the edges 6ª are straight. Their length measured radially of the cutter is at least equal to and preferably slightly greater than the width of the work piece measured in a direction transversely to the feed.

The blades are mounted in the cutter body so that the edge portions 6ª will be inclined at an angle $a$ slightly less than a right angle relative to the cutter axis 11 so as to lie on the frustum of a very shallow cone 10 the axis 12 of which coincides with the cutter axis. The exact cone angle $b$ of the frustum will be influenced by numerous factors including the desired rate of feed to be used and the character of the finish to be formed on the work. For most applications, the cone angle $b$ will not exceed two degrees and a cone angle of about one degree would be employed to produce a finished surface of optimum smoothness.

While the outer cutting edge portions 6ᵇ may be curved slightly if desired, it is preferred, in order to facilitate sharpening of the cutter, to make these edge portions substantially straight. As shown, they lie on the frustum of a shallow cone 13 whose axis coincides with that of the inner cone 10. The slope or cone angle $c$ of the outer cone is greater than the angle $b$ but nevertheless is very small, preferably the angle $c$ being on the order of four degrees. Its magnitude is influenced mainly by the depth of the metal layer 14 to be removed from the work piece, the desired rate of feed to be employed, and the cutting speed which is permissible with the cutting material of which the blade edges are composed. For cuts of ordinary depth, for example, one-eighth of an inch, the angle $c$ will range from two to five degrees and will not, even where thicker cuts are to be taken, exceed a maximum of ten degrees. For a given application, the length of the edge portions 6ᵇ will depend mainly on the proportion of the layer 14 which is to be removed by such edge portions.

It will be observed that the inner and outer edge portions 6ª and 6ᵇ of the blades 5 form two concentric frusto-conical cutting faces of different slopes intersecting on a circle on which the points 6ᶜ fall. By making the corresponding edge portions 6ª and 6ᵇ on the same blade instead of different blades, the blade construction is simplified, sharpening of the cutter is facilitated, and a maximum number of blades may be provided on a cutter of given size.

Machines of various types may be utilized in carrying out the invention with the cutter constructed as above described, several different types being shown by way of example in my patent referred to above. In one form shown in Fig. 1, the relative feed motion between a work piece W and the rotating cutter I is along a rectilinear path, the work support or table 17 being the movable element. The work piece is secured to the table by suitable clamps 16 and the table slides along ways on a bed 18. Reciprocatory motion may be imparted to the table by an electric motor 21 operating through speed reduction gearing to drive a screw 22 threading into a nut on the table. The cutter I is fast on a spindle journaled in a suitable bearing 19 disposed close to the cutter so as to provide a cutter mounting of proper rigidity. The spindle is driven through speed reduction mechanism by an electric motor 20. Preferably, the direction of spindle rotation is such that during engagement with the work, the blades 5 move in a direction opposite to that of the work piece.

The setup for milling a layer 14 from a work piece to form a plane finished surface 25 thereon involves clamping the work piece onto the table 17 with the plane of the surface 25 tangent to the conical frustum 10 or inner cutting face, the line of tangency being indicated at 26. Secondly, the work piece is offset laterally from the cutter axis a distance such that the path of feed is along a chord of the inner cutting face disposed outwardly beyond the orbit of the inner ends of the blade edges 6ª and within the orbit described by the points of intersection 6ᶜ of the edge portions 6ª and 6ᵇ. Opposite ends of each cutting edge 6ª thus project beyond opposite sides of the work surface 25 and the entire length of the associated edge 6ᵇ is disposed beyond the remote side of the work.

During a milling operation, let it be assumed that the cutter is rotated and the work fed in the directions indicated by the arrows (Figs. 6 and 7) and at rates such as to produce a feeding movement 30 per cutter tooth. As will be seen from Figs. 6 and 7, each blade edge 6, while engaging the work, moves generally longitudinally of the direction of feed while progressing arcuately across the work, entering the latter along the line 26 of tangency on the finished surface and rising very gradually through the layer 14 to a line 27 of emergence on the rough surface 28.

Several blades, eight in this instance, act simultaneously as shown in Fig. 6. To explain the cutting action more in detail, reference will first be made to Fig. 7 which shows successive steps in the progress of one blade edge as it advances broadwise through the work. The initial engagement is with the cutting edge portion 6ª only, entry being along the line 26 of tangency between the inner frusto-conical cutting face and the finished work surface 25. Shortly after entry, the edge will be disposed in the first position shown in Fig. 7 in which the outer end 6ᶜ of the edge portion 6ª projects a short distance beyond the side of the work piece remote from the cutter axis.

In the continued advance, the zone of engagement with the work shifts outwardly along the edge 6ª until the latter, after passing the second position shown, reaches a position 31 on the outer edge of the work piece at which the point 6ᶜ of intersection of the blade edges 6ª and 6ᵇ enters the work and then starts to move therethrough along an arcuate path 32 which is disposed in advance of the line 32ª formed on the work piece by the point 6ᶜ of the preceding blade. The amount which the outer end of the edge 6ª overhangs the work at the beginning of the cut is such that the distance between the line 26 and the point 31 exceeds the feed 30 per tooth.

Beyond the position 31, the inner end of the edge portion 6b of the blade becomes effective and the zone of its engagement with the work continues to progress outwardly while the blade is passing the third, fourth, and fifth positions shown. By the time the blade reaches a position 34, the outer end of the edge 6b will have risen through the metal layer 14 and will start to emerge from the rough surface 34. Then, the zone of engagement will shift inwardly along the edge 6b as the latter emerges from the work along the line 27 which is disposed in advance of the line 27a of emergence of the preceding blade.

The inner edge 6a leaves the work when the blade passes beyond the sixth position and reaches a point 35 on the side of the work nearest the cutter axis. Thereafter, only the outer edge 6b will be active. As the edge continues to rise through the upper part of the layer 14 and passes the eighth position shown, the zone of engagement narrows until the edge finally emerges completely from the work at a point 36.

In this progressing through the work, the edges of each blade remove a chip 37 (Figs. 8 and 15) equal in width to that of the work and extending in the direction of feed from the line 26 of entry of the edge 6a on the finished surface 25 to the line 27 of emergence on the rough surface. Thus, the length of the chip is many times the feed 30 per tooth.

The path of the blade edge up through the layer 14 of stock from the finished surface to the rough surface is controlled by the angles b and c of the inner and outer conical cutting faces. Thus, it will be seen from Fig. 5 that along the side of the work piece adjacent the cutter axis, the edge 6a traverses a path 38 which falls on the flattest portion of an ellipse 39 which is the projection of the orbit traversed by the points 6c of the blades on a plane perpendicular to the finished work surface along the near side of the work. In this same plane, the outer edge 6b of the blade emerges on a line 40 which extends between the ellipse 38 and an ellipse 41 which is the projection on said plane of the orbit traversed by the outermost end of the blade edge 6b. Since the ellipses 37 and 41 which control the chip thickness have very small minor axes due to the small cone angles b and c and very long major axes which are equal to the maximum diameters of the inner and outer conical cutting faces, each chip 37 is very long and its maximum thickness indicated at 43 removed by each edge is a very small proportion of the feeding movement 30 per tooth.

The chip tapers to a feather edge at the line 26 of edge entry. The thickness increases very gradually as the cut progresses (see Figs. 9, 10, and 15), the transverse section becoming inclined slightly relative to the finished work surface owing to the angle b of the cone 10. After the edge 6b has entered the work (Fig. 11), opposite sides of the chip will be angularly disposed relative to each other and the part being cut by the edge 6b will, owing to its larger cone angle c, be somewhat thicker. In view of the transverse inclination of the chip, the outer end of the edge 6b approaches the scale layer on the rough surface of the work at a time when the outer end of the edge 6a is about to emerge from the work but is still disposed a substantial distance below the scale (see Fig. 12). Then, in the final part of the cut, the edge 6b cuts through the scale layer progressively across the work and outwardly along the edge as illustrated in Figs. 13 and 14.

From the foregoing, it will be observed that the metal layer 14 is removed from the work in a succession of slices or chips 37 by taking cuts generally longitudinally of the work along the lines shown in Fig. 15 and that the edges 6a of successive blades remove the metal in the part 45 of the layer adjacent the finished surface while the remaining part 46 including the scale on the rough surface is removed by the outer edges 6b. In this way, the major cutting burden, that of cutting through the hard scale at and adjacent the rough surface of the casting, is sustained by edges 6b. The inner edges 6a do not enter the scale area and their cutting action is confined to the lower and softer part of the layer 14. Thus, the edges 6a, which alone control the smoothness of the finish, are not heavily burdened and will retain their sharpness in service long after the edges 6b start to become dull. As a result, the smoothness of the final surface is not in any way influenced by the condition of the edges 6a and the cutter is capable of producing a fine finish through long service use regardless of the scaly character of the rough surface.

In addition, a better finish on the final surface 25 is produced by employing a very small cone angle b on the inner cutting face. Thus, the angle at which each edge 6a enters the work and progresses through the latter in the initial part of the cut and the smoothness of the finished surface is improved accordingly. The use of such a small angle does not, however, prevent the removal of a metal layer of substantial thickness, the latter being controlled by the lengths of the edges 6b and the slope of the conical frustum on which they lie.

I claim as my invention:

1. The method of removing a layer of material from a work piece to form a smooth finished surface thereon comprising revolving a series of cutting edges defining an inner shallow frusto-conical face wider than said surface and a contiguous outer coned face of greater slope than said first mentioned face, positioning a work piece with the plane of said surface to be formed disposed tangent to said inner face and with the latter adapted for intersection with said layer only below the rough surface of the work piece, and effecting relative feeding movement by the said revolving edges and said work piece along a path spaced from the axis of revolution of said edges but within the circle of intersection of said faces whereby the lower part of said layer is cut into thin slices by said inner face and the remainder is cut into thicker slices by said outer face.

2. The method of removing material from a work piece to form a smooth finished surface thereon comprising revolving a series of cutting edges defining an inner shallow coned face of a width greater than that of said surface and a contiguous outer coned face of greater slope than said first mentioned face, positioning a work piece with the plane of said surface to be formed disposed tangent to said first mentioned face, and effecting relative feeding movement between the said revolving edges and said work piece along a path spaced from the axis of revolution of said edges but within the circle of intersection of said faces, each edge portion of said inner face alone remaining in engagement with the work a distance from the line of entry greater than the feeding movement per cutting edge.

3. The method of removing material from a work piece to form a flat finished surface thereon comprising revolving a series of cutting edges defining an inner shallow frusto-conical face of a width greater than that of said surface and a contiguous outer coned face of greater slope than said first mentioned face, positioning a work piece with the plane of said surface to be formed disposed tangent to said first mentioned face, and effecting relative feeding movement between the revolving edges and said work piece along a path spaced from the axis of revolution of said edges but within the circle of intersection of said faces.

4. A machine tool for removing material from a work piece to form a flat finished surface thereon comprising, in combination, a work support, a cutter head power rotated about an axis inclined only slightly away from a perpendicular to the plane of the finished surface of a work piece mounted on said work support, a series of cutting edges of lengths greater than the width of said finished surface angularly spaced around an end of said head so as to revolve in a shallow conical frustum, a second series of cutting edges angularly spaced around said end outwardly beyond said first edges and defining a coned cutting face of greater slope than said frustum and intersecting the latter, and power actuated mechanism for relatively feeding said work support and said head along a path offset from said axis to bring said work piece within the cutting range of said first edges but spaced inwardly from the outer ends thereof, whereby said first edges engage the work along a tangent of said frustum and cut through the lower portion of the material layer to be removed while said second edges enter the work above said finished surface and cut through the upper portion of said layer emerging on the rough work surface.

5. A machine tool for removing metal from a work piece to form a flat finished surface thereon comprising, in combination, a support carrying said work piece, a cutter head power rotated about an axis inclined away from a perpendicular to the plane of the finished surface of a work piece by an angle of approximately two degrees, a series of cutting edges of lengths greater than the width of said finished surface angularly spaced around an end of said head so as to revolve in a shallow conical frustum having a cone angle equal to said first mentioned angle, a second series of cutting edges angularly spaced around said end outwardly beyond said first edges and defining a coned cutting face intersecting said frustum and having a cone angle less than ten and more than two degrees, and power actuated mechanism for relatively feeding said work support and said head along a path offset from said axis with said frustum tangent to the plane of the finished surface to be formed.

6. A machine tool for removing metal from a work piece to form a smooth finished surface thereon comprising, in combination, a support for a work piece, a cutter head power rotated about an axis inclined away from a perpendicular to the plane of the finished surface of said work piece, power actuated mechanism for relatively feeding said work support and said head along a path offset from said axis, an annular series of cutting edges on said head revolving in a shallow conical frustum and operable during said feeding movement to engage the work along a tangent of said frustum and cut through the lower portion of the metal layer, and a second annular series of cutting edges carried by said head outwardly beyond said first edges and operable during said feeding movement to remove the upper portion of said layer in thin metal slices.

7. A machine tool for removing metal from a work piece to form a flat finished surface thereon comprising, in combination, a power rotated cutter head, a series of cutting edges of lengths greater than the width of the finished work surface to be formed angularly spaced around an end of said head so as to revolve in a shallow conical frustum, a second series of cutting edges angularly spaced around said end outwardly beyond said first edges and defining a coned cutting face of greater slope than said frustum and intersecting the latter, and power actuated mechanism for relatively feeding said work support and said head along a path offset from said axis to bring said work piece within the cutting range of said first edges, the outer ends of said first edges overhanging the work piece during a feeding movement greater than the feeding movement per cutting edge.

8. A cutter for removing a layer of material from a work piece to form a smooth surface thereon by relative feeding movement between the cutter and the work piece parallel to said surface, said cutter comprising a rotary body, a plurality of elongated blades angularly spaced around an end face of said body, and cutting edges on said blades cooperating to define adjacent concentric cutting faces of shallow frusto-conical contour, the outer face having a larger cone angle than the inner face.

9. A cutter for removing a layer of material from a work piece to form a smooth surface thereon by relative feeding movement between the cutter and the work piece parallel to said surface, said cutter comprising a rotary body, a plurality of elongated blades angularly spaced around an end face of said body, and cutting edges on said blades cooperating to define concentric cutting faces of shallow frusto-conical contour, the inner face having a cone angle of a few degrees and the outer face having a substantially greater cone angle.

10. A cutter for removing a layer of metal from a work piece to form a smooth surface thereon by relative feeding movement between the cutter and the work piece parallel to said surface, said cutter comprising a rotary body, a plurality of elongated blades angularly spaced around an end face of said body, cutting edges formed on the inner end portions of said blades and cooperating to define a shallow frusto-conical cutting face, and cutting edges formed on the remaining outer end portions of the blades and cooperating to define a coned cutting face having greater slope than said first mentioned face.

11. A cutter for removing a layer of metal from a work piece to form a smooth surface thereon by relative feeding movement between the cutter and the work piece parallel to said surface, said cutter comprising a rotary body, and a plurality of elongated blades angularly spaced around an end face of said body, cutting edges formed on the inner end portions of said blades and cooperating to define a shallow coned cutting face, and cutting edges formed on the remaining outer end portions of said blades and cooperating to define a coned cutting face having greater slope than said first mentioned face.

12. A cutter for removing a layer of material from a work piece to form a smooth surface thereon by relative feeding movement between the cutter and the work piece parallel to said surface, said cutter comprising a rotary body, and a plurality of elongated blades angularly spaced around an end face of said body, cutting edges formed on the inner end portions of said blades and cooperating to define a shallow frusto-conical cutting face having a cone angle of approximately two degrees, and cutting edges formed on the remaining outer end portions of said blades and cooperating to define a generally frusto-conical cutting face having a cone angle not exceeding ten degrees.

13. A machine tool for removing metal from a work piece to form a flat finished surface thereon comprising, in combination, a power rotated cutter head, a series of cutting edges of lengths greater than the width of the finished work surface to be formed angularly spaced around an end of said head so as to revolve in a shallow conical frustum, a second series of cutting edges angularly spaced around said end outwardly beyond said first edges and defining a cutting face of greater slope than frustum, and power actuated mechanism for relatively feeding said work support and said head along a path offset from said axis to bring said work piece within the cutting range of said first edges.

CHARLES E. KRAUS.